United States Patent
Broers et al.

(10) Patent No.: US 12,102,055 B2
(45) Date of Patent: Oct. 1, 2024

(54) CONTROL DEVICE, A LIGHTING SYSTEM, AND A METHOD

(71) Applicant: SIGNIFY HOLDING B.V., Eindhoven (NL)

(72) Inventors: Harry Broers, 's-Hertogenbosch (NL); Marc Andre De Samber, Lommel (BE)

(73) Assignee: SIGNIFY HOLDING B.V., Eindhoven (NL)

(*) Notice: Subject to any disclaimer, the term of this patent is extended or adjusted under 35 U.S.C. 154(b) by 80 days.

(21) Appl. No.: 17/913,666

(22) PCT Filed: Mar. 22, 2021

(86) PCT No.: PCT/EP2021/057261
§ 371 (c)(1),
(2) Date: Sep. 22, 2022

(87) PCT Pub. No.: WO2021/191143
PCT Pub. Date: Sep. 30, 2021

(65) Prior Publication Data
US 2023/0116693 A1 Apr. 13, 2023

(30) Foreign Application Priority Data
Mar. 26, 2020 (EP) .................................... 20165760

(51) Int. Cl.
*A01K 1/00* (2006.01)
*A01K 29/00* (2006.01)
(Continued)

(52) U.S. Cl.
CPC .......... *A01K 1/0076* (2013.01); *A01K 29/005* (2013.01); *A01K 45/00* (2013.01); *H05B 47/105* (2020.01)

(58) Field of Classification Search
CPC .... H05B 47/105; A01K 29/005; A01K 45/00; A01K 1/0047
(Continued)

(56) References Cited

U.S. PATENT DOCUMENTS

| 6,498,987 B1* | 12/2002 | Kelly | G06Q 30/02 |
| | | | 702/3 |
| 2005/0257748 A1* | 11/2005 | Kriesel | A22B 5/007 |
| | | | 119/51.02 |
| 2011/0101883 A1 | 5/2011 | Grajcar | |

(Continued)

FOREIGN PATENT DOCUMENTS

WO 2019027319 A1 2/2019

OTHER PUBLICATIONS

Alimuddin, et al.: "Temperature Control System in Closed House for Broilers Based on ANFIS", Telkomnika (Telecomunication Computing Electronics and Control), vol. 10, No. 1, Mar. 1, 2012.
H. Lin, et al.: "Strategies for Preventing Heat Stress in Poultry", World's Poultry Science Journal, vol. 62, No. 1, Mar. 1, 2006, pp. 71-86.

(Continued)

*Primary Examiner* — Brady W Frazier
*Assistant Examiner* — Zoe Tam Tran

(57) ABSTRACT

The invention relates to pre-conditioning an animal(s) to (the risk of) heat stress. The invention provides a control device for controlling a lighting device to illuminate at least one animal in a space, wherein the control device is configured to: obtain prediction data indicative of a value of an environmental condition in said space during a future time period; determine said value of the environmental condition based on the prediction data; determine a prediction of heat stress of the at least one animal in said space during the future time period if said value of the environmental condition falls within a predefined limit for heat stress; control, upon determining said prediction of heat stress, a lighting (Continued)

device to illuminate the at least one animal in said space with a lighting characteristic at least partly before said future time period.

14 Claims, 2 Drawing Sheets

(51) Int. Cl.
*A01K 45/00* (2006.01)
*H05B 47/105* (2020.01)

(58) Field of Classification Search
USPC .......................................................... 119/448
See application file for complete search history.

(56) References Cited

U.S. PATENT DOCUMENTS

2015/0212236 A1* 7/2015 Haas ........................ G06T 7/337
  382/100
2016/0323971 A1   11/2016 Theobald
2018/0333244 A1*  11/2018 Hanks .................. A61B 5/7278
2019/0012497 A1    1/2019 Ralston et al.
2019/0297855 A1*  10/2019 Wolf, II ................ A01K 31/20

OTHER PUBLICATIONS

J-M. Aerts, et al.: "Modelling the Statistic and Dynamic Responses of Total Heat Production of Broiler Chickens to Step Changes in Air Temperature and Light Intensity", British Poultry Science, vol. 41, No. 5, Dec. 1, 2000, pp. 651-659.

* cited by examiner

CONTROL DEVICE, A LIGHTING SYSTEM, AND A METHOD

CROSS-REFERENCE TO PRIOR APPLICATIONS

This application is the U.S. National Phase application under 35 U.S.C. § 371 of International Application No. PCT/EP2021/057261, filed on Mar. 22, 2021, which claims the benefit of European Patent Application No. 20165760.8, filed on Mar. 26, 2020. These applications are hereby incorporated by reference herein.

FIELD OF THE INVENTION

The invention relates to a control device for controlling a lighting device to illuminate at least one animal in a space. The invention further relates to a lighting system comprising such a control device and a lighting device. The invention further relates to a method of controlling a lighting device to illuminate at least one animal in a space; and corresponding computer program product performing said method. The invention particularly relates to pre-conditioning the at least one animal in the space to heat stress.

BACKGROUND OF THE INVENTION

Agriculture in modern communities has become more industrialized. This is also the case for animal farming. The number of animals (and corresponding animal density), the associated infrastructures and the various growing methods are scaled up to achieve economically viable production of food (e.g. meat) at relatively low price levels. Such an upscaling may however affect animal welfare and health.

For example: The scaling up from a simple chicken coop to an industrial stable with at least tens of thousands of chicken (e.g. broilers) packed with a density of up to twenty chicken per square meter may lead to major issues when anomalies occur in the environmental conditions of the stable. Monitoring and controlling an environmental control system in an animal housing is for example seen in US2019/012497.

Heat stress of the animals may be such an anomaly. Namely, it has been shown that heat stress negatively affects the welfare and productivity of broilers and laying hens. Many broiler farms have e.g. too limited cooling capacity to keep the ambient temperatures low during e.g. hot periods of summer. One option is to use fog spraying systems to keep the temperature within acceptable levels. However, it may be disadvantageous to introduce water vapor inside such broiler farms because of mold formation, bacterial spread, etc.; particularly for novel farms that operate as closed systems and/or grow broilers free of antibiotics. The same disadvantage related to heat stress may also apply to other examples of animal farming, such as e.g. pig farming.

SUMMARY OF THE INVENTION

The occurrence of heat stress may thus be a problem in animal farms. The present invention leverages the insight that the thermotolerance of animals may be increased by 'thermal manipulation' of the animals prior to the actual occurrence of high temperatures associated with heat stress. Such 'thermal manipulation' may be considered as pre-conditioning of said animals to the occurrence of heat stress, wherein the pre-conditioning may be performed by providing illumination comprising a lighting characteristic.

Hence, considering this insight, it is an object of the invention to provide an improved control device for controlling a lighting device to illuminate at least one animal in a space, which at least alleviates the problems and disadvantages mentioned above. Thereto, the invention provides a control device for controlling a lighting device to illuminate at least one animal in a space, wherein the control device is configured to: obtain prediction data indicative of a value of an environmental condition in said space during a future time period; determine said value of the environmental condition based on the prediction data; determine a prediction of heat stress of the at least one animal in said space during the future time period if said value of the environmental condition falls within a predefined limit for heat stress; control, upon determining said prediction of heat stress, a lighting device to illuminate the at least one animal in said space with a lighting characteristic at least partly before said future time period. The control device may alternatively be phrased as a controller.

Thus, by obtaining the prediction data indicative of a value of an environmental condition in said space during the future time period and determining said value, the control device is able to obtain a forecast for a future environmental condition in said space. This value of the future environmental condition may convey heat stress to the at least one animal. The control device is therefore configured to determine a prediction of heat stress of the at least one animal in the space during the future time period if said value of the (determined) environmental condition falls within a predefined limit for heat stress. The control device is thereby able to predict (the risk of) heat stress of the at least one animal based on the obtained prediction data.

Upon determining said prediction of heat stress, the control device is configured to control a lighting device to illuminate the at least one animal in said space with a lighting characteristic at least partly before said future time period. As a result, the present invention enables (illumination based) conditioning of the at least one animal to said heat stress before the environmental condition occurs. Due to this conditioning (or: pre-conditioning), the at least one animal may adapt e.g. its behavior before the occurrence of said value of the environmental condition, such that the at least one animal may be prepared and/or adopt to the future anomalous situation during the future time period. This is a clear advantage for animal farming.

For example: The at least one animal to be a flock of chicken. The environmental condition may be ambient temperature. Therefore, a predicted period with a (heat-stress-inducing) high temperature value would normally cause heat stress of the flock of chicken. However, such heat stress may be mitigated by pre-conditioning the flock of chicken with illumination comprising a lighting characteristic, which may induce behavioral change in the flock of chicken. Such a lighting characteristic may e.g. be reddish light that induces the flock of chicken to perceive the actual ambient temperatures higher, which may thus lead to the flock of chicken to drink more and show less activity before the predicted period with a high ambient temperature value. The flock of chicken will therefore be better prepared to the predicted period with a high ambient temperature, because of the (effects of the) mentioned pre-conditioning, hence heat stress of the flock of chicken will be reduced or prevented.

Said space may for example be a farm, a stable, or a pen. Said space may also be a geographical location. Said space may be an outdoor area or range. Said lighting device may be a luminaire, a spotlight, a LED strip, a pixilated LED spot, a projector, and/or a wall washer. Said lighting device may be an array of lighting devices, or at least one lighting device.

Said illuminating the at least one animal in said space may be defined as directly illuminating at least a part of the at least one animal. The corresponding illumination may for example be received via retinal light reception. Illumination may for example comprise a directionality matching the eye-height of the animals, e.g. horizontal lighting. For birds, such as chicken, the corresponding illumination may for example be received via (direct) skull penetration. The corresponding illumination may for example be received by a main body of the at least one animal.

Said illuminating the at least one animal in said space may, additionally and/or alternatively, be defined illuminating an area visible and/or perceivable to the at least one animal.

Said limit may for example be prestored in a memory associated with the control device. In examples, said prediction of heat stress may be determined if said value of the environmental condition exceeds or drops beyond a predefined threshold for heat stress of the at least one animal, which predefined threshold may be a bound of said predefined limit for heat stress of the at least one animal. Said predefined limit may for example be a (numerical) range.

In alternative aspects, said predefined limit may for example be set, or may be determined, or may be based on at least one of: a type of a stable, a demographic of the at least one animal (such as e.g. an age or gender), a cooling performance or quality of a HVAC system, etc.

Hence, in aspects, the control device may comprise a memory for storing said predefined limit for heat stress of the at least one animal. The control device may be configured to receive or retrieve said predefined limit from an external device, such as a user input device or a server for hosting said predefined limit (i.e. e.g. a plurality of predefined limits associated to heat stress of a respective animal of the at least one animal).

In aspects, the control device may be configured to output a control command configured to control said lighting device to illuminate the at least one animal in said space with a lighting characteristic at least partly before said future time period.

In an embodiment, the environmental condition may be at least one of: ambient temperature, ambient radiation level, relative humidity, solar radiation level, CO2 concentration, air speed, ammonia level. Particular levels of ambient temperature may convey heat stress to the at least one animal. The same applies to particular levels of relative humidity, solar radiation, and CO2 concentration. A limited air speed may also reduce convective flow within a space, such as the stable, thereby conveying heat stress to the at least one animal.

As mentioned, said environmental condition may be ammonia level. Such ammonia (gas) may decrease the resistance of the at least one animal to heat stress, and thereby be a relevant environmental condition to consider. In aspects, said environmental condition may be a gas concentration, such as e.g. chloride concentration or nitrogen concentration.

In aspects, ambient radiation level may e.g. originate from a radiation source, such as e.g. a structural building element, an object, or an (other) animal or animal density (for example, a high density of chickens may render an increased ambient radiation from neighboring chickens).

Said heat stress may in aspects be considered undercooling as well (i.e. e.g. negative heat stress).

In an embodiment, the at least one animal may belong to the group of: pigs, chicken, birds, horse and/or cattle. For example, the at least one animal may be poultry, such as a chicken, hen, or a broiler. Alternatively, said at least one animal may belong the group of: fish, shrimps, reptiles and/or insects.

The at least one animal may for example be an animal suitable for consumption. The at least one animal may be a mammal. Alternatively, said at least one animal may belong to the group of: rodents and/or reptiles. Hence, the at least one animal may for example be at least one of: a pig, a suckling, a horse, a sheep, a bull, a cow, a chick, a mink, a rabbit, or a snake. Said at least one animal may be a single animal as mentioned above, but may also be a plurality of such animals. The at least one animal may for example be any group of animals, such as e.g. a flock of chicken, a herd of cows, or a group of horses.

The at least one animal may also be a leader animal of a group of animals. Some groups of animals tend to demonstrate social/group behavior, such as e.g. pigs. Hence, in aspects of the invention: the mentioned pre-conditioning by means of illumination (according to the invention) may apply to the leader of such a group of animals. The invention may thereby cause said leader to adapt behavior so as to be prepared to the predicted occurrence of heat stress during said future time period. Since the leader of the group of animals may be copied by the (rest of the) group of animals (due to said social/group behavior), the group of animals may follow the leader in behavior and also be able to cope with said occurrence of the predicted heat stress. Such copying behavior may for example be applicable to pigs.

In an embodiment, the prediction data may comprise the value of the environmental condition in said space during the future time period. Thus, the prediction data may be the value of the environmental condition in said space during the future time period itself. For example, the prediction data may be a temperature level value (e.g. of a weather forecast) in said space during the future time period. This temperature level value may then be determined by the control device, i.e. without any further processing. Such an embodiment renders advantageously a more efficient control device, as the prediction data already provides the value of the environmental condition.

In an alternative embodiment, the control device may be configured to determine the value of the environmental condition in said space during the future time period by extrapolating the prediction data to said future time period. Thus, the control device may predict the value of said environmental condition in said space during the future time period based on the prediction data. For example, the prediction data may comprise a series of actual values of the environmental condition in said space (e.g. temperature values), which the control device may extrapolate to the future time period, so as to obtain the value of the environmental condition in said space during the future time period (e.g. the future predicted temperature value). Such an embodiment may advantageously provide the control device with intelligence for computing or determining such a predicted value for the future time period. It also provides a degree of (computational) autonomy to the control device.

In aspects, a relation between external environmental conditions and an environmental condition in said space (e.g. the stable) may be defined and/or computed as well. For example, knowing external environmental condition such as solar radiation, air temperature, and/or wind level may render e.g. ambient temperature in said space (e.g. the stable) by means of computation, e.g. by using predefined models for making such a translation.

Hence, in aspects, the prediction data may be indicative of value(s) of a (respective) external environmental condition(s) in an external space during the future time period, and wherein the control device may be configured to determine the value of the environmental condition in said space during the future time period by translating the prediction data to said space. For example, the control device may be configured to determine the value of the environmental condition in said space during the future time period by translating the prediction data to said space and extrapolating the prediction data to said future time period. For example, the prediction data may comprise the value(s) of a (respective) external environmental condition(s) in an external space during the future time period, and the control device may be configured to translate the value(s) of the (respective) external environmental condition(s) in the external space to said space. The external space may be external to said space. For example, a stable and its surroundings.

In an embodiment, the prediction data may comprise weather forecast information associated with a location of said space; and/or wherein the prediction data comprises climate control settings associated with said space. For example, the prediction data may comprise the weather forecast information of a region of a farm in which the at least one animal is accommodated.

In an embodiment, the control device may be configured to: receive or retrieve said prediction data from at least one of: an external server, a user input device, a building management system, a sensor device. The control device may thereby comprise a transceiver for receiving or retrieving said prediction data from said at least one of an external server, a user input device, a building management system, a sensor device. For example, the control device may retrieve said (desired) prediction data from an external server comprising weather forecast information. For example, the control device may receive said prediction data from a user input device, so as to enable the control device to mitigate the predicted occurrence of heat stress for the at least one animal. For example, the control device may retrieve or receive said prediction data from a sensor device, which sensor device measures values of the environmental condition in said space. Other examples and/or combinations may similarly be envisioned.

As mentioned, upon determining said prediction of heat stress, the control device is configured to control a lighting device to illuminate the at least one animal in said space with a lighting characteristic at least partly before said future time period. In an embodiment, the lighting characteristic may be selected based on the value of the environmental condition. In an embodiment, the lighting characteristic may comprise at least one of: a color, a color temperature, an intensity, a spectral distribution, a light recipe, a modulation, a light pattern, a light scene, a light schedule.

For example, if said value of the environmental condition falls within a first predefined limit for heat stress, a first lighting characteristic may be selected to illuminate the at least one animal with. For example, if said value of the environmental condition falls within a second predefined limit for heat stress, a second lighting characteristic may be selected to illuminate the at least one animal with. The first lighting characteristic may e.g. be a color and/or a spectral distribution, whereas the second lighting characteristic may e.g. be an intensity and/or light schedule. Such examples advantageously enable a response to the predicted occurrence of heat stress that is tailored to the value of the environmental condition rendering the risk of heat stress. If a stable gets for example very hot for a long duration, it may be desired to provide a light schedule that encourages the animals to sleep, whereas if the stable gets slightly hot for short duration, it may be desired to provide a light spectrum encouraging the animals to drink water.

Hence, in an embodiment, the value of the environmental condition according to the invention may be additionally or alternatively be a duration of the environmental condition. In an embodiment, the lighting characteristic may thus be selected based on the duration of the environmental condition More specifically, in an embodiment the lighting characteristic may comprise red light having a peak wavelength between 600 to 780 nanometers. The effect of such an embodiment is that the red light creates a perception and/or feeling of warmth for the at least one animal, for example a bird (e.g. chicken). The at least one animal is therefore induced (i.e. e.g. 'tricked') to adapt behavior accordingly, such as a higher water intake and lower movement, which leads to a better prepared metabolic status of at least one animal for the predicted occurrence of heat stress (due to the value of the environmental condition during the future time period).

Additionally, or alternatively, in aspects, the lighting characteristic may comprise a color temperature of at most 4000 Kelvin, preferably at most 3000 Kelvin, more preferably at most 2000 Kelvin. Hence, said red light may comprise a color temperature of at most 4000 Kelvin, preferably at most 3000 Kelvin, more preferably at most 2000 Kelvin.

More specifically, in an embodiment, the lighting characteristic may comprise a light schedule preceding the future time period; wherein the light schedule comprises a first period with a first light intensity followed by a second period with a second light intensity, wherein the second light intensity is lower than the first light intensity. In a further embodiment, the first period may be characterized by a light period for the at least one animal and the second period may be characterized by a dark period for the at least one animal.

Such embodiments may be advantageous. The effect of such a light schedule is that the at least one animal, for example a bird (e.g. chicken), may have an adapted optimal homeostasis for heat stress tolerance. Namely:

The first period in the light schedule comprises a higher light intensity (e.g. a light period) compared to the light intensity of the second period. This leads to higher water consumption in the first period and creates a stronger and better adapted at least one animal prior to the onset of the predicted occurrence of heat stress (i.e. e.g. a temperature value falling within a predetermined limit). The subsequent second period has a lower light intensity (e.g. a dark period) compared to the light intensity of the first period. This leads to a decrease in feed consumption, which reduces the digestion processes prior the future time period, which lowers the internal heating of the body of the at least one animal. In aspects, the light schedule may also be arranged to put the at least one animal in a low-activity, e.g. sleep, mode for the future time period.

In aspects of the invention, heat may conversely be defined in the opposite direction, namely as cooling. The heat stress may therefore alternatively comprise undercooling stress, or undercooling. The control device according to the invention, and related embodiments, may mutatis mutandis apply to undercooling of the at least one animal, e.g. chicken. In such alternative cases, the lighting characteristic may comprise cool blue light. Thus, in aspects of the invention, there may be provided: a control device for controlling a lighting device to illuminate at least one animal in a space, wherein the control device is configured to: obtain prediction data indicative of a value of an environmental condition in said space during a future time period; determine said value of the environmental condition based on the prediction data; determine a prediction of undercooling of the at least one animal in said space during the future time period if said value of the environmental condition falls within a predefined limit for undercooling; control, upon determining said prediction of undercooling, a lighting device to illuminate the at least one animal in said space with a lighting characteristic at least partly before said future time period. The lighting characteristic may comprise cool blue light having a peak wavelength between 380 and 500 nanometers, preferably between 450 and 485 nanometers. The lighting characteristic may also comprise cool white light having a color temperature of at least 4500 Kelvin, preferably at least 6000 Kelvin, more preferably at least 7000 Kelvin.

It is a further object of the invention to provide an improved lighting system. Thereto, the invention further provides a lighting system comprising the control device according to the invention and a lighting device (according to the invention). The control device may thereby be configured to control the lighting device. Thereby, advantages and/or embodiments applying to the control device according to the invention may mutatis mutandis apply to said lighting system according to the invention.

In an embodiment, the lighting system further comprises a prediction device; wherein the control device is configured to receive or retrieve said prediction data from the prediction device; wherein the prediction device is at least one of an external server, a user input device, a building management system, a sensor device.

It is a further object of the invention to provide an improved luminaire. Thereto, the invention further provides a luminaire comprising a housing, wherein the housing accommodates the control device and the lighting device according to the invention. The lighting device may therefore be a lighting unit.

It is a further object of the invention to provide an improved method of controlling a lighting device to illuminate at least one animal in a space. Thereto, the invention further provides a method of controlling a lighting device to illuminate at least one animal in a space, wherein the method comprises: obtaining prediction data indicative of a value of an environmental condition in said space during a future time period; determining said value of the environmental condition based on the prediction data; determining a prediction of heat stress of the at least one animal in said space during the future time period if said value of the environmental condition falls within a predefined limit for heat stress; controlling, upon determining said prediction of heat stress, a lighting device to illuminate the at least one animal in said space with a lighting characteristic at least partly before said future time period. Thereby, advantages and/or embodiments applying to the control device according to the invention may mutatis mutandis apply to said method according to the invention.

In an embodiment, the method may comprise: determining the value of the environmental condition in said space during the future time period by extrapolating the prediction data to said future time period. In an embodiment, the method may comprise: receive or retrieve said prediction data from at least one of: an external server, a user input device, a building management system, a sensor device. In an embodiment, the method may comprise: outputting a control command configured to control said lighting device to illuminate the at least one animal in said space with a lighting characteristic at least partly before said future time period.

The invention further relates to a computer program product. Hence, the invention provides a computer program product for a computing device, the computer program product comprising computer program code to perform the method(s) according to the invention when the computer program product is run on a processing unit of the computing device. Thus, aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

BRIEF DESCRIPTION OF THE DRAWINGS

The invention will now be further elucidated by means of the schematic non-limiting drawings.

DETAILED DESCRIPTION

As partly mentioned above, heat stress may negatively affect the welfare and productivity of animals in a space, for example broilers and laying hens. The present invention prevents or reduces the occurrence of heat stress for such animals. This is done by pre-conditioning the animals with a lighting characteristic provided in the illumination of a lighting device. Namely, the present invention forecasts (the risk of) heat stress, because the control device is configured to determine the value of the environmental condition in said space during the future time period based on obtained prediction data; and determine a prediction of heat stress based thereupon. Moreover, upon determining said prediction of heat stress, the control device controls the lighting device to illuminate the at least one animal in said space with a lighting characteristic at least partly before said future time period. This pre-conditions the animals to adapt their behavior at least partly before said future time period. This behavioral change makes them better prepared for the future time period with the value of the environmental condition that would normally result in the occurrence of heat stress of the at least one animal, but due to said preparation (or: pre-conditioning) now can cope with said value of the environmental condition and not experience the heat stress. Non-limiting examples will now be provided.

Figure 1:
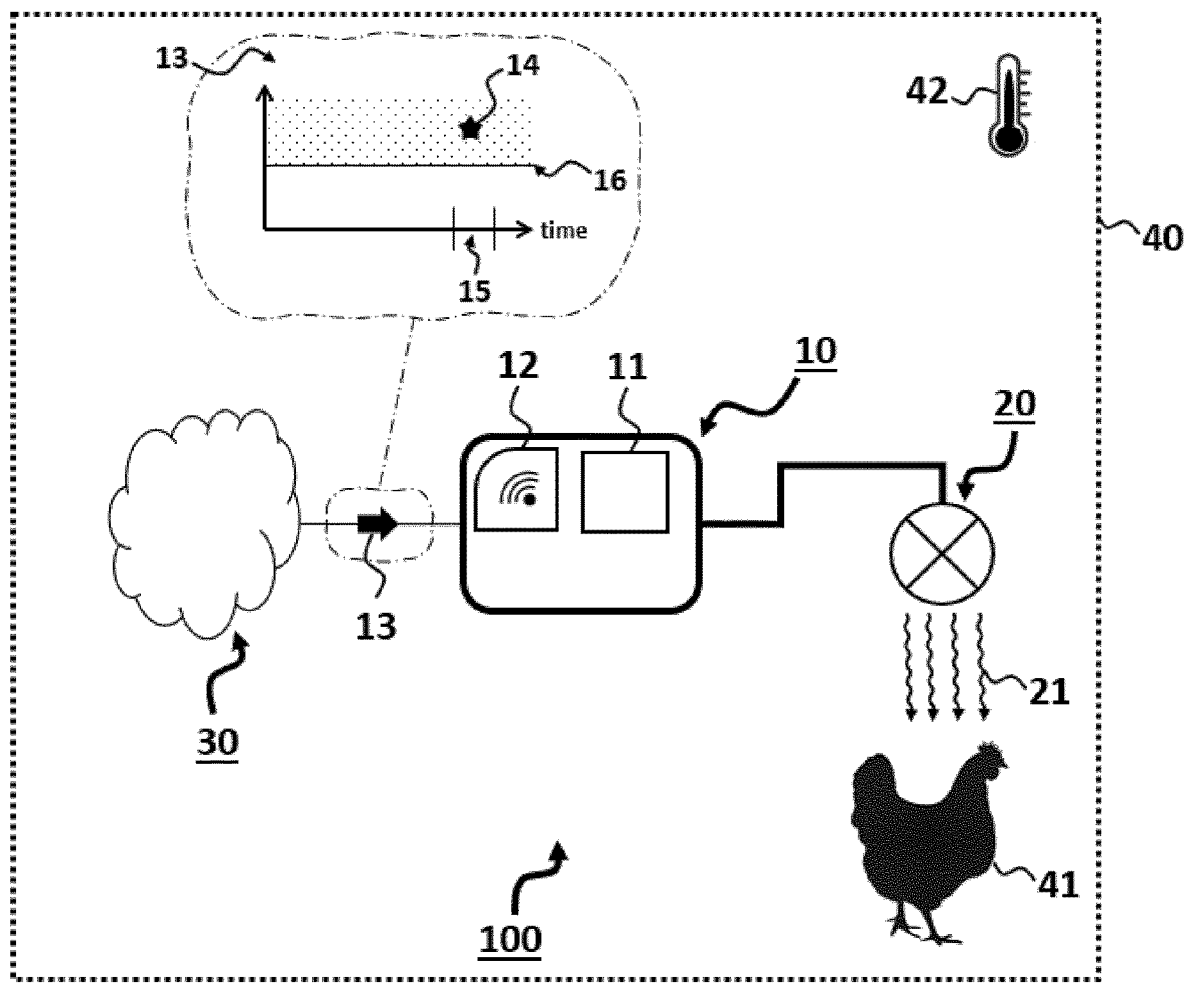
FIG. 1 depicts schematically an embodiment of a lighting system according to the invention, wherein the lighting system comprises the control device according to the invention, a lighting device and a prediction device.

FIG. 1 depicts schematically, by non-limiting example, an embodiment of a lighting system 100 comprising a control device 10, a lighting device 20 and a prediction device 30. The lighting device 20 is provided in a space 40. The control device 10 is configured to control the lighting device 20. The space 40 is the location of an animal farm. The lighting device 20 is arranged to illuminate at least one animal 41. The at least one animal is a flock of chicken 41. The prediction device 30 and the control device 10 may be outside said space 40, but for convenience both are depicted within the boundaries of said space 40, thus inside the boundaries of the animal farm.

The space 40 comprises an environmental condition 42. The environmental condition is ambient temperature 42 at the location of the animal farm 40. Alternatively, said environmental condition may be one of: relative humidity, solar radiation level, CO2 concentration, air speed. The prediction device 30 is a server configured to provide a weather forecast (thus: a weather forecast server), and in particularly provide values of the environmental condition 42 in future periods of time.

The control device 10 comprises a control unit 11 and a wireless transceiver unit 12. The wireless transceiver unit may alternatively be any other input/output means for communication. The wireless transceiver unit 12 is in communication with the prediction device 30, i.e. the weather forecast server 30. This communication is an internet communication, e.g. via a wireless router. Alternatively, a wired connection may be envisioned.

The control device 10, via the operations of the control unit 11 and the wireless transceiver unit 12, receives prediction data 13 from the prediction device 30, i.e. the weather forecast server. Hence, the control device 10 obtains the prediction data 13. Here, the prediction data 13 is a value 14 of the environmental condition 42 in said space 40 (i.e. the location of the animal farm) during a future time period 15. Here, the future time period 15 is halve a day ahead, but may alternatively be any future period of time. The prediction device may alternatively be a climate control device and the prediction data may alternatively be climate control settings associated with said space.

Consequently, by receiving said prediction data 13, the control device 10 and its corresponding control unit 11 determine the value 14 of the ambient temperature 42 in said space 40 during the future time period 15 based on the prediction data 13. Referring to FIG. 1, by non-limiting example, the value 14 is forty-two degrees Celsius ambient temperature at the future time period of halve a day ahead.

In case the value 14 of the ambient temperature 42 exceeds a particular threshold, the flock of chicken 41 will experience heat stress. Such thresholds are known in animal literature and studies for various types of animals and/or breeds of animal. The normal body temperature of a chicken is commonly known to be around forty degrees Celsius. Here, a predefined limit 16 for heat stress of the flock of chicken 41 is stored in (e.g. a local memory of) the control unit 11 of the control device 10. The limit 16 is defined as the range of ambient temperatures above forty degrees Celsius. Alternatively, any other suitable limit for heat stress may be envisioned depending on the type and/or breed of the animal.

Still referring to FIG. 1, the control unit 11 of the control device 10 determines a prediction of heat stress of the flock of chicken 41 at the location 40 of the animal farm if the value 14 of said environmental condition 42 falls within the predefined limit 16 for heat stress. Here, the value 14 falls within said limit 16 for heat stress, because the value 14 exceeds a boundary of said limit 16. That is: the value 14 of forty-two degrees Celsius falls within the above mentioned limit 16 for heat stress of the flock of chicken 41 of above forty degrees Celsius.

Hence, the control device 10 determines the prediction of heat stress of the flock of chicken 41 at the location of the farm 40 during the future time period 15. Upon determining the prediction of heat stress, the control unit 11 of the control device 10 controls the lighting device 20 to illuminate the flock of chicken 41 with a lighting characteristic 21 at least partly before said future time period 15. Here, the lighting characteristic 21 is red light having a peak wavelength between 600 to 780 nanometers. Alternatively, the lighting characteristic may be one of: a color, a color temperature, an intensity, a spectral distribution, a light recipe, a modulation, a light pattern, a light scene, a light schedule.

Due the red light 21 provided to the flock of chicken 41 at least partly before said future time period 15, the flock of chicken 41 will perceive (a feeling of) warmth at the actual environmental condition (which at the actual moment does not comprise a value causing heat stress). Due to said perception and/or feeling of warmth, the flock of chicken 41 will adapt their behavior by drinking more water and lowering their movement. This is a behavior observed for chicken when temperatures increase. This improves the metabolic state of the flock of chicken 41 to a state in which the flock of chicken 41 can cope better with the occurrence of heat stress. Since the flock of chicken 41 adapts to this behavior before said future time period 15 in which the value 14 of the ambient temperature 42 falls within the limit 16 of heat stress, the flock of chicken 41 are better prepared when said value 14 of the ambient temperature 42 falls within said limit 16 of heat stress. This advantageously improves animal welfare and the productivity of the animal farm.

Figure 2:
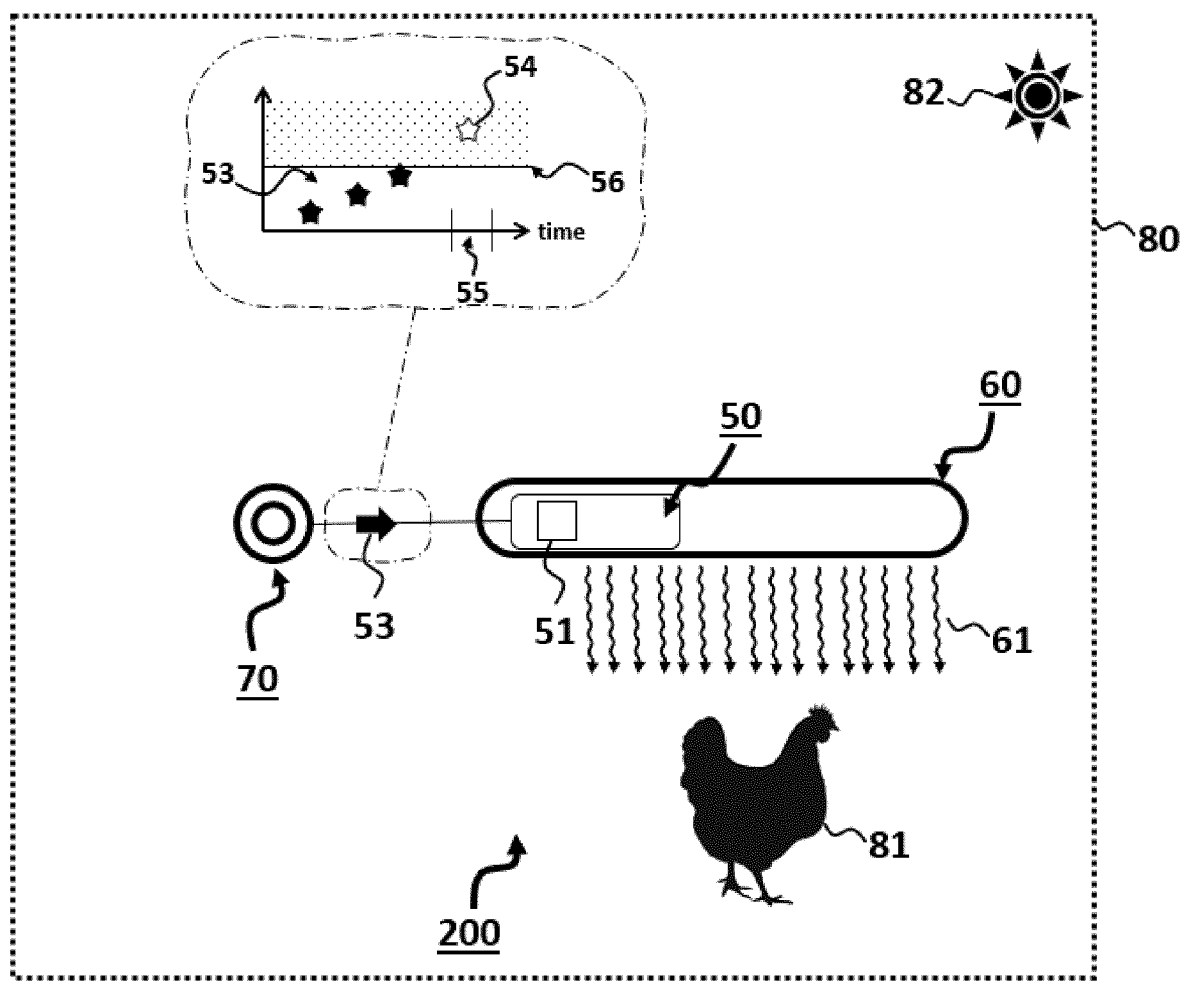
FIG. 2 depicts schematically an embodiment of a lighting system according to the invention, wherein the lighting system comprises the control device according to the invention, a lighting device and a prediction device.

FIG. 2 depicts schematically, by non-limiting example, an embodiment of a lighting system 200 comprising a control device 50, a lighting device 60 and a prediction device 70. The lighting device 60 is provided in a space 80. The lighting device 60 is a luminaire that comprises the control device 50. Hence, the control device 50 is part of the lighting device 60. Alternatively, the lighting device and the control device may be separate parts accommodated in different areas, not necessarily in said space 80 together. The control device 50 is configured to control the lighting device 60. The space 80 is a stable. The lighting device 60 is arranged to illuminate at least one animal 81. The at least one animal is a flock of chicken 81, but may alternatively be any other animal or group of animals mentioned in the present application, such as e.g. a pig, a swine, a horse, a cow, sheep, etc. The prediction device 70 may be outside said space 80, but here the prediction device 70 is within the boundaries of the stable 80.

The stable 80 comprises an environmental condition 82. The environmental condition is solar radiation 82. Alternatively, said environmental condition may be one of: ambient temperature, relative humidity, CO2 concentration, air speed. The prediction device 70 is a sensor configured to measure actual (and keep track of past) values (or: levels) of solar radiation 82.

The control device 50 comprises a control unit 51 (or: processor) and an input interface (not depicted) for receiving information. Said input interface may be in communication with other devices via a wired connection, or via a wireless connection. In the latter case, the input interface may be a wireless transceiver unit. The input interface is in communication with the prediction device 70, i.e. the sensor 70. Here, this communication is a wired connection.

The control device 50, via the operations of the control unit 51 and via the input interface, retrieves (or alternatively receives) prediction data 53 from the sensor 70. Hence, the control device 50 obtains the prediction data 53. Here, the prediction data 53 is a set of (historical and/or actual) values 53 of the environmental condition 82 in said space 80; i.e. a set of (historical and/or actual) values 53 of the solar radiation 82 in said stable 80.

Based on the prediction data 53, hence said set of (historical and/or actual) values, the control unit 51 of the control device 50 subsequently determines a value 54 of the solar radiation 82 in the stable 80 during a future time period 55. This is done by extrapolating the prediction data 53, i.e. said set of (historical and/or actual) values, to said future time period 55. The control unit 51 may also optionally use solar radiation models for more accuracy, i.e. knowing when the sun goes up and sets down.

Consequently, by retrieving said prediction data 53, the control device 50 and its corresponding control unit 51 determine the value 54 of the environmental condition 82 (i.e. solar radiation) in said space 80 (i.e. said stable) during the future time period 55 by extrapolating the prediction data 53 to said future time period 55. The future time period 55 is e.g. noon.

In case the value 54 of solar radiation 82 exceeds a particular threshold, the flock of chicken 81 will experience heat stress. Such thresholds are known in animal literature and studies for various types of animals and/or breeds of animal. Solar radiation levels may also be coupled to temperature levels in said stable.

Still referring to FIG. 2, the control unit 51 of the control device 50 determines a prediction of heat stress of the flock of chicken 81 at the stable 80 if the value 54 of said environmental condition 82 (i.e. solar radiation) falls within a predefined limit 56 for heat stress. Here, in the present example, the value 54 falls within said limit 56 for heat stress. Hence, the control device 50 determines the prediction of heat stress of the flock of chicken 81 at the stable 80 during the future time period 55.

Thus, due to the extrapolated (historical and/or actual) solar radiation values 53 measured by the sensor 70 the control device 50 determines that at noon 55 the solar radiation value will be falling within the limit for heat stress 56 of the flock of chicken 81.

Upon determining the prediction of heat stress, the control unit 51 of the control device 50 controls the lighting device 60 to illuminate the flock of chicken 81 with a lighting characteristic 61 at least partly before said future time period 55. Here, the lighting characteristic 61 is a light schedule. Alternatively, the lighting characteristic may be one of: a color, a color temperature, an intensity, a spectral distribution, a light recipe, a modulation, a light pattern, a light scene.

The light schedule precedes the future time period 55 (i.e. noon). The light schedule comprises a first period with a first light intensity followed by a second period with a second light intensity. The second light intensity is lower than the first light intensity. More specifically, the first light intensity is characterized by a light period for the flock of chicken, whereas the second light intensity is characterized by a dark period for the flock of chicken. For example, the first period may be from 09:00 to 10:00 hours, whereas the second period may be from 10:00 to 12:00 hours. Thereby, the light schedule preceding the future time period of noon.

The effect of this light schedule is that the flock of chicken 81 will have an adapted optimal homeostasis for heat stress tolerance. Namely: Due to the first period being a light period, the flock of chicken will consume more water and thereby the flock of chicken 81 will be more prepared to a future time period with (the risk of) heat stress. Due to the second time period being a dark period, the second time period being just before the future time period, the flock of chicken 81 will decrease feed consumption and rest more. This reduces the digestion process, and thereby the internal heat production, within chickens of the flock of chicken 81 just before the future time period with (the risk of) heat stress. Hence, the flock of chicken 81 is better prepared to the heat stress and can cope with the heat stress. This is advantageous for the wellbeing of the flock.

Figure 3:
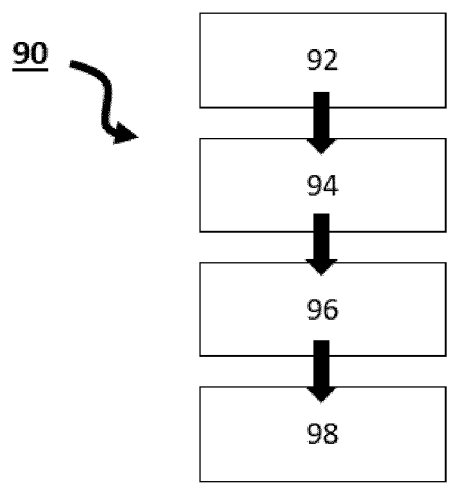
FIG. 3 depicts schematically a method according to the invention.

FIG. 3 depicts schematically, by non-limiting example, a method 90 of controlling a lighting device to illuminate at least one animal in a space. The method 90 may be performed by the lighting systems, and corresponding control devices, depicted in FIG. 1 and FIG. 2.

The method 90 comprises a first step 92 of obtaining prediction data indicative of a value of an environmental condition in said space during a future time period; and a second step 94 of determining said value of the environmental condition based on the prediction data. These steps are performed by the control device, or e.g. by a controller or processor of the control device. Obtaining said prediction data may for example be either retrieving or receiving said prediction data. Here, the prediction data comprises the value of said environmental condition in said space during the future time period, hence said value can be determined based on the prediction data rather directly.

However, alternatively, the determining of said value of the environmental condition in said space during a future time period may be by a step of extrapolating the prediction data to said future time period, or e.g. comparing said prediction data to predefined prediction models storing a list of prediction data coupled to said value in said space during the future time period, which comparison may subsequently provide said value. This may for example be a weather forecast model.

The method further comprises the step 96 of determining a prediction of heat stress of the at least one animal in said space during the future time period if said value of the environmental condition falls within a predefined limit for heat stress. The method further comprises the step 98 of controlling, upon determining said prediction of heat stress, a lighting device to illuminate the at least one animal in said space with a lighting characteristic at least partly before said future time period. The lighting characteristic may comprise at least one of: a color, a color temperature, an intensity, a spectral distribution, a light recipe, a modulation, a light pattern, a light scene, a light schedule. The lighting characteristic may be suitable for preparing the at least one animal to (the risk of) heat stress, such that the at least one animal can better cope with said heat stress.

The invention claimed is:

1. A control device for controlling a lighting device to illuminate at least one animal in a space, wherein the control device is configured to:
   obtain prediction data indicative of a value of an environmental condition in said space during a future time period;
   determine said value of the environmental condition based on the prediction data;
   determine a prediction of heat stress of the at least one animal in said space during the future time period if said value of the environmental condition falls within a predefined limit for heat stress; and control, upon determining said prediction of heat stress, a lighting device to illuminate the at least one animal in said space with a lighting characteristic at least partly before said future time period, wherein the lighting characteristic is configured to pre-condition the at least one animal to the heat stress;

wherein the lighting characteristic comprises red light having a peak wavelength between 600 to 780 nanometers.

2. The control device according to claim 1, wherein the environmental condition is at least one of: ambient temperature, ambient radiation level, relative humidity, solar radiation level, CO2 concentration, air speed, ammonia level.

3. The control device according to claim 1, wherein the prediction data comprises the value of the environmental condition in said space during the future time period.

4. The control device according to claim 1, wherein the control device is configured to determine the value of the environmental condition in said space during the future time period by extrapolating the prediction data to said future time period.

5. The control device according to claim 1, wherein the lighting characteristic is selected based on the value of the environmental condition.

6. The control device according to claim 1, wherein the lighting characteristic comprises a light schedule preceding the future time period;

wherein the light schedule comprises a first period with a first light intensity followed by a second period with a second light intensity, wherein the second light intensity is lower than the first light intensity.

7. The control device according to claim 6, wherein the first period is characterized by a light period for the at least one animal and the second period is characterized by a dark period for the at least one animal.

8. The control device according to claim 1, wherein the control device is configured to:

receive or retrieve said prediction data from at least one of: an external server, a user input device, a building management system, a sensor device.

9. The control device according to claim 1, wherein the prediction data comprises weather forecast information associated with a location of said space.

10. A lighting system comprising a lighting device and a control device for controlling the lighting device to illuminate at least one animal in a space, wherein the control device is configured to:

obtain prediction data indicative of a value of an environmental condition in said space during a future time period;

determine said value of the environmental condition based on the prediction data;

determine a prediction of heat stress of the at least one animal in said space during the future time period if said value of the environmental condition falls within a predefined limit for heat stress; and control, upon determining said prediction of heat stress, a lighting device to illuminate the at least one animal in said space with a lighting characteristic at least partly before said future time period, wherein the lighting characteristic is configured to pre-condition the at least one animal to the heat stress; and wherein the lighting characteristic comprises red light having a peak wavelength between 600 to 780 nanometers.

11. The lighting system according to claim 10, wherein the lighting system further comprises a prediction device;

wherein the control device is configured to receive or retrieve said prediction data from the prediction device;

wherein the prediction device is at least one of an external server, a user input device, a building management system, a sensor device.

12. A method of controlling a lighting device to illuminate at least one animal in a space, the method comprising:

obtaining prediction data indicative of a value of an environmental condition in said space during a future time period;

determining said value of the environmental condition based on the prediction data;

determining a prediction of heat stress of the at least one animal in said space during the future time period if said value of the environmental condition falls within a predefined limit for heat stress; and controlling, upon determining said prediction of heat stress, a lighting device to illuminate the at least one animal in said space with a lighting characteristic at least partly before said future time period, wherein the lighting characteristic is configured to pre-condition the at least one animal to the heat stress;

wherein the lighting characteristic comprises red light having a peak wavelength between 600 to 780 nanometers.

13. A non-transitory computer readable medium comprising instructions, the instructions when executed by a processor of a computing device cause the processor to perform the method of claim 12.

14. The control device according to claim 1, wherein the prediction data comprises climate control settings of a climate control device associated with said space.

* * * * *